US012462875B2

(12) United States Patent
Chen et al.

(10) Patent No.: US 12,462,875 B2
(45) Date of Patent: Nov. 4, 2025

(54) PROGRAM SCHEME FOR EDGE DATA WORDLINES IN A MEMORY DEVICE

(71) Applicant: Micron Technology, Inc., Boise, ID (US)

(72) Inventors: Hong-Yan Chen, San Jose, CA (US); Ching-Huang Lu, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 278 days.

(21) Appl. No.: 17/959,171

(22) Filed: Oct. 3, 2022

(65) Prior Publication Data

US 2023/0162796 A1 May 25, 2023

Related U.S. Application Data

(60) Provisional application No. 63/281,328, filed on Nov. 19, 2021.

(51) Int. Cl.
*G11C 16/08* (2006.01)
*G11C 16/04* (2006.01)
*G11C 16/10* (2006.01)
*G11C 16/32* (2006.01)

(52) U.S. Cl.
CPC .......... *G11C 16/08* (2013.01); *G11C 16/0483* (2013.01); *G11C 16/10* (2013.01); *G11C 16/32* (2013.01)

(58) Field of Classification Search
CPC ..... G11C 16/08; G11C 16/0483; G11C 16/10; G11C 16/32; G11C 11/5671; G11C 16/3427; G11C 11/5628; G11C 8/08; G11C 7/12; G11C 16/34
See application file for complete search history.

(56) References Cited

U.S. PATENT DOCUMENTS

| | | | |
|---|---|---|---|
| 10,510,413 B1* | 12/2019 | Diep | G11C 16/10 |
| 2016/0093390 A1* | 3/2016 | Yuan | G11C 16/3459 |
| | | | 714/764 |
| 2019/0198117 A1* | 6/2019 | Yu | G11C 11/5628 |
| 2023/0091314 A1* | 3/2023 | Wang | G11C 16/30 |
| | | | 365/189.011 |

\* cited by examiner

*Primary Examiner* — Mohammed A Bashar
(74) *Attorney, Agent, or Firm* — Lowenstein Sandler LLP

(57) ABSTRACT

Control logic in a memory device causes a program voltage to be applied to a selected data wordline of a plurality of wordlines of a block of a memory array for a pulse duration period during a programming operation. The control logic further causes a first pass voltage to be applied to one or more unselected data wordlines of the plurality of wordlines of the block for the pulse duration period and causes a second pass voltage to be applied to a last unselected data wordline of the plurality of wordlines of the block for at least a first portion of the pulse duration period, wherein the second pass voltage has a lower magnitude than the first pass voltage.

20 Claims, 8 Drawing Sheets

| Select Line | SGD |
|---|---|
| WL185 | Dummy |
| WL184 | Dummy |
| WL183 | Dummy |
| WL182 | MLC |
| WL181 | QLC |
| ⋮ | |
| WL95 | |
| WL94 | MLC |
| WL93 | Dummy |
| WL92 | Dummy |
| WL91 | MLC |
| WL90 | QLC |
| ⋮ | |
| WL4 | |
| WL3 | MLC |
| WL2 | Dummy |
| WL1 | Dummy |
| WL0 | Dummy |
| Select Line | SGS |

FIG. 3

PROGRAM SCHEME FOR EDGE DATA WORDLINES IN A MEMORY DEVICE

RELATED APPLICATIONS

This application claims the benefit of U.S. Provisional Application No. 63/281,328, filed Nov. 19, 2021, the entire contents of which are hereby incorporated by reference herein.

TECHNICAL FIELD

Embodiments of the disclosure relate generally to memory sub-systems, and more specifically, relate to an improved program scheme for edge data wordlines in a memory device of a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 3 is a block diagram illustrating a wordline configuration of a block in a memory device in accordance with some embodiments of the present disclosure.

DETAILED DESCRIPTION

Figure 1A:
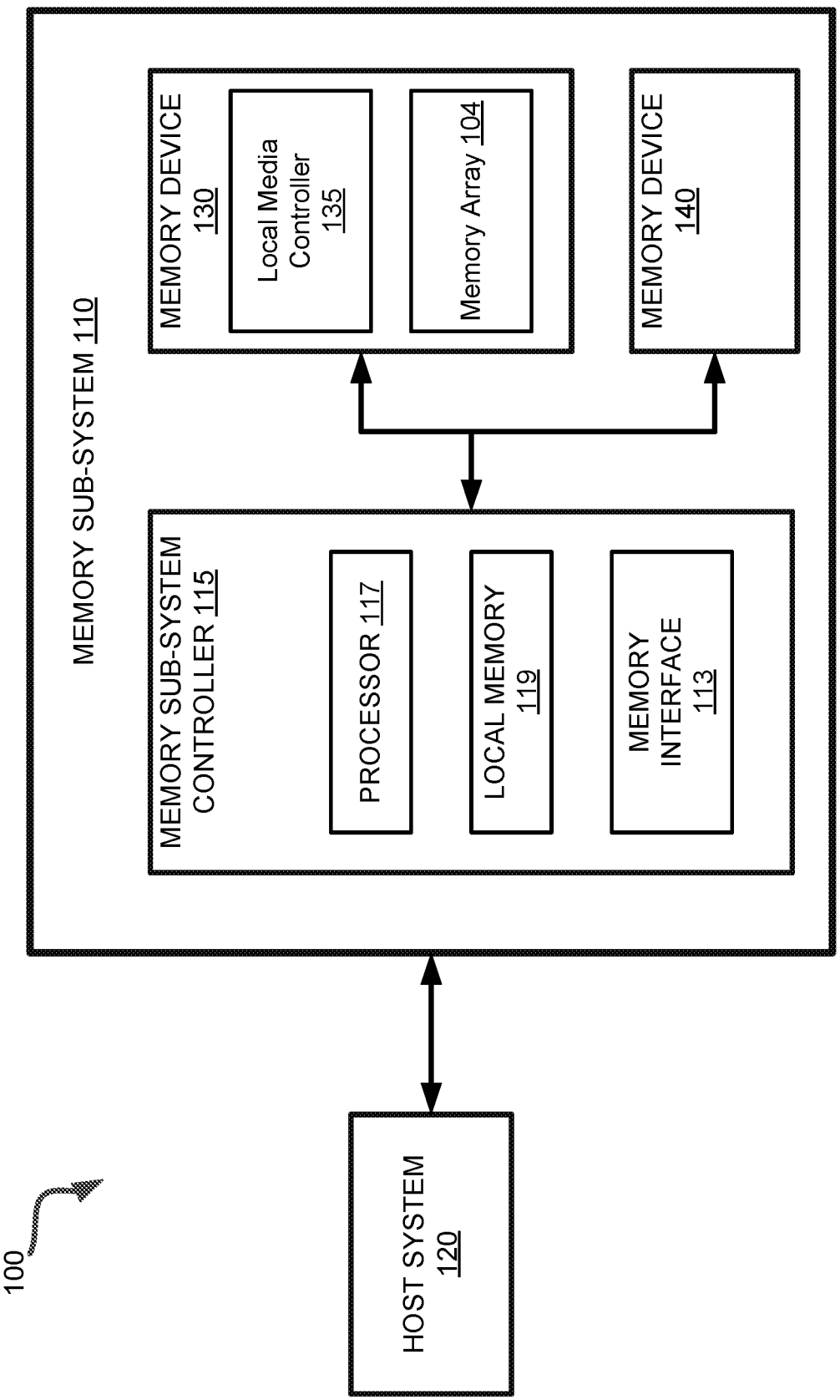
FIG. 1A illustrates an example computing system that includes a memory sub-system in accordance with some embodiments of the present disclosure.

Aspects of the present disclosure are directed to an improved program scheme for edge data wordlines in a memory device of a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. For example, NAND memory, such as 3D flash NAND memory, offers storage in the form of compact, high density configurations. A non-volatile memory device is a package of one or more dice, each including one or more planes. For some types of non-volatile memory devices (e.g., NAND memory), each plane includes a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells.

Memory pages (also referred to herein as "pages") store one or more bits of binary data corresponding to data received from the host system. The memory cells of a block can be arranged along a number of separate wordlines. Each block can include a number of sub-blocks, where each sub-block is defined by an associated pillar (e.g., a vertical conductive trace) extending from a shared bitline. Since the sub-blocks can be accessed separately (e.g., to perform program or read operations), the block can include a structure to selectively enable the pillar associated with a certain sub-block, while disabling the pillars associated with other sub-blocks. This structure can include one or more select gate devices positioned at either or both ends of each pillar. Depending on a control signal applied, these select gate devices can either enable or disable the conduction of signals through the pillars.

During a programming operation, a selected memory cell(s) can be programmed with the application of a programming voltage to a corresponding selected wordline. Due to the wordline being common to multiple memory cells, unselected memory cells can be subject to the same programming voltage as the selected memory cell(s). In addition, unselected memory cells associated with other wordlines in the memory device can be affected. If not otherwise preconditioned, the unselected memory cells can experience effects from the programming voltage on the common wordline. These programming voltage effects can include the condition of charge being stored in the unselected memory cells which are expected to maintain stored data. This programming voltage effect is termed a "programming disturbance" or "program disturb" effect. The program disturb effect can render the charge stored in the unselected memory cells unreadable altogether or, although still apparently readable, the contents of the memory cell can be read as a data value different than the intended data value stored before application of the programming voltage.

The presence of electrons, such as electrons inside the poly-silicon channel of a charge storage structure can contribute to the program disturb effect. For example, the data wordlines can suffer from hot-electron ("hot-e") disturb where a large voltage differential between the gate and source causes the channel electrons to be injected from a drain depletion region into the floating gate. In addition, this voltage differential can initiate an electrostatic field of sufficient magnitude to change the charge on the selected wordline and cause the contents of the memory cell to be programmed inadvertently or read incorrectly. Furthermore, the electrostatic field can cause local electron-hole pair generation in the channel region, leading to even more electrons that can be injected into the selected wordline.

Certain memory devices are arranged in blocks having a number of vertically stacked wordlines associated with the memory cells. A given block, for example, can include a number of wordlines at the bottom of the stack and a number of wordlines at the top of the stack which are not used to store host or system data. These unused wordlines can be referred to as "dummy wordlines." The actual data wordlines associated with memory cells used to store host and/or system data can be arranged, for example, in a number of decks between the top and bottom dummy wordlines. Each deck of data wordlines can further be separated by one or more dummy wordlines. Such a memory device can typically program each block starting with the wordlines at the bottom of the stack and finishing at the top of the stack, for example. The data wordlines within each deck that are adjacent to the surrounding dummy wordlines can be referred to as "edge data wordlines." In certain memory devices, the edge data wordlines often experience stronger program disturb effects than other data wordlines. In particular, the last data wordline to be programmed in a programming operation (e.g., the top edge data wordline of a top deck in the block) can experience a shift in measured threshold voltage while other data wordlines lower down in the stack are programmed. Like all other unselected wordlines, the last data wordlines to be programmed receives a pass voltage when another wordline in the block is being programmed, but the proximity of the last data wordline to the select gate devices at the top of the stack and the associated voltage differential in the channel region causes hot-e injection leading to possible corruption of data stored or to be stored on the last data wordline. Attempts to smooth the voltage differential by fine tuning voltages applied to the dummy wordlines between the last data wordline and the select gate devices have practical limits (e.g., due to oxide-nitride layer pitch scaling) that cannot always counteract the program disturb effects.

Aspects of the present disclosure address the above and other deficiencies by providing an improved program scheme for edge data wordlines in a memory device of a memory sub-system. In one embodiment, control logic in the memory device can perform a programming operation to be performed on memory cells in a block of the memory device associated with corresponding wordlines. In one embodiment, the wordlines are arranged in a vertical stack, and the programming operation is performed sequentially from a first data wordline at a bottom of the vertical stack to a last data wordline at a top of the vertical stack. This last data wordline can be adjacent to one or more dummy wordlines at the top of the vertical stack, for example. To perform the programming operation, the control logic can cause a program voltage to be applied to a selected data wordline of the block for a certain pulse duration period. Concurrently, the control logic can cause one or more pass voltages to be applied to unselected data wordlines of the block. For example, the control logic can cause a first pass voltage to be applied to most of the unselected data wordlines of the block for the pulse duration period, and can cause a second pass voltage to be applied to the last unselected data wordline for at least a first portion of the pulse duration period. In one embodiment, the second pass voltage has a lower magnitude than the first pass voltage.

Advantages of this approach include, but are not limited to, improved program performance in the memory device. The second pass voltage applied to the last data wordline for at least a portion of the pulse duration period having a lower magnitude than the first pass voltage applied to other unselected wordlines causes a voltage potential in the channel region at the last data wordline to be lower, thereby reducing a voltage differential in the channel region between the last data wordline, the adjacent dummy wordlines, and a select gate device at the top of the vertical stack. The reduced voltage differential reduces or eliminates the hot-e injection which reduces or eliminates the program disturb effects at the last data wordline. This can result in more accurate programming at the edge data wordlines with fewer errors being produced.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device 130 having control logic (e.g., local controller 135) on the die and a controller (e.g., memory sub-system controller 115) for media management within the same memory device package. An example of a managed memory device is a managed NAND (MNAND) device. Memory device 130, for example, can represent a single die having some control logic (e.g., local media controller 135) embodied thereon. In some embodiments, one or more components of memory sub-system 110 can be omitted.

In one embodiment, memory sub-system 110 includes a memory interface component 113. Memory interface component 113 is responsible for handling interactions of memory sub-system controller 115 with the memory devices of memory sub-system 110, such as memory device 130. For example, memory interface component 113 can send memory access commands corresponding to requests received from host system 120 to memory device 130, such as program commands, read commands, or other commands. In addition, memory interface component 113 can receive data from memory device 130, such as data retrieved in response to a read command or a confirmation that a program command was successfully performed. In some embodiments, the memory sub-system controller 115 includes at least a portion of the memory interface 113. For example, the memory sub-system controller 115 can include a processor 117 (e.g., a processing device) configured to execute instructions stored in local memory 119 for performing the operations described herein. In some embodiments, the memory interface component 113 is part of the host system 110, an application, or an operating system.

In one embodiment, memory device 130 includes local media controller 135 and a memory array 104. As described herein, the memory array 104 can include a number of blocks, where each block includes a number of sub-blocks. Each sub-block can include a number of vertical memory strings including memory cells coupled to corresponding wordlines. In one embodiment, the wordlines in the block can be arranged in a vertical stack, where programming operations are typically performed sequentially from a first data wordline at a bottom of the vertical stack to a last data wordline at the top of the vertical stack. Local media controller 135 can be responsible for overseeing, controlling, and/or managing data access operations, such as programming operations, performed on the memory array 104 of memory device 130. In one embodiment, local media controller 135 can cause a program voltage to be applied to a selected data wordline of a block in memory array 104 for a certain pulse duration period. Concurrently, local media controller 135 can cause one or more pass voltages to be applied to unselected data wordlines of the block. For example, local media controller 135 can cause a first pass voltage to be applied to most of the unselected data wordlines of the block for the pulse duration period, and can cause a second pass voltage to be applied to the last unselected data wordline for at least a first portion of the pulse duration period. In one embodiment, the second pass voltage has a lower magnitude than the first pass voltage. Depending on which selected wordline in the block is being programmed, local media controller 135 can vary a length of the first portion of the pulse duration period. In some instances, the first portion of the pulse duration period includes the entire pulse duration period (i.e., only the second lower pass voltage is applied to the last data wordline). In other instances, the first portion of the pulse duration period is shorter than the entire pulse duration period, and local media controller 135 can cause the first higher pass voltage to be subsequently applied to the last data wordline for a second portion of the pulse duration period. Further details with regard to the operations of local media controller 135 are described below.

Figure 1B:
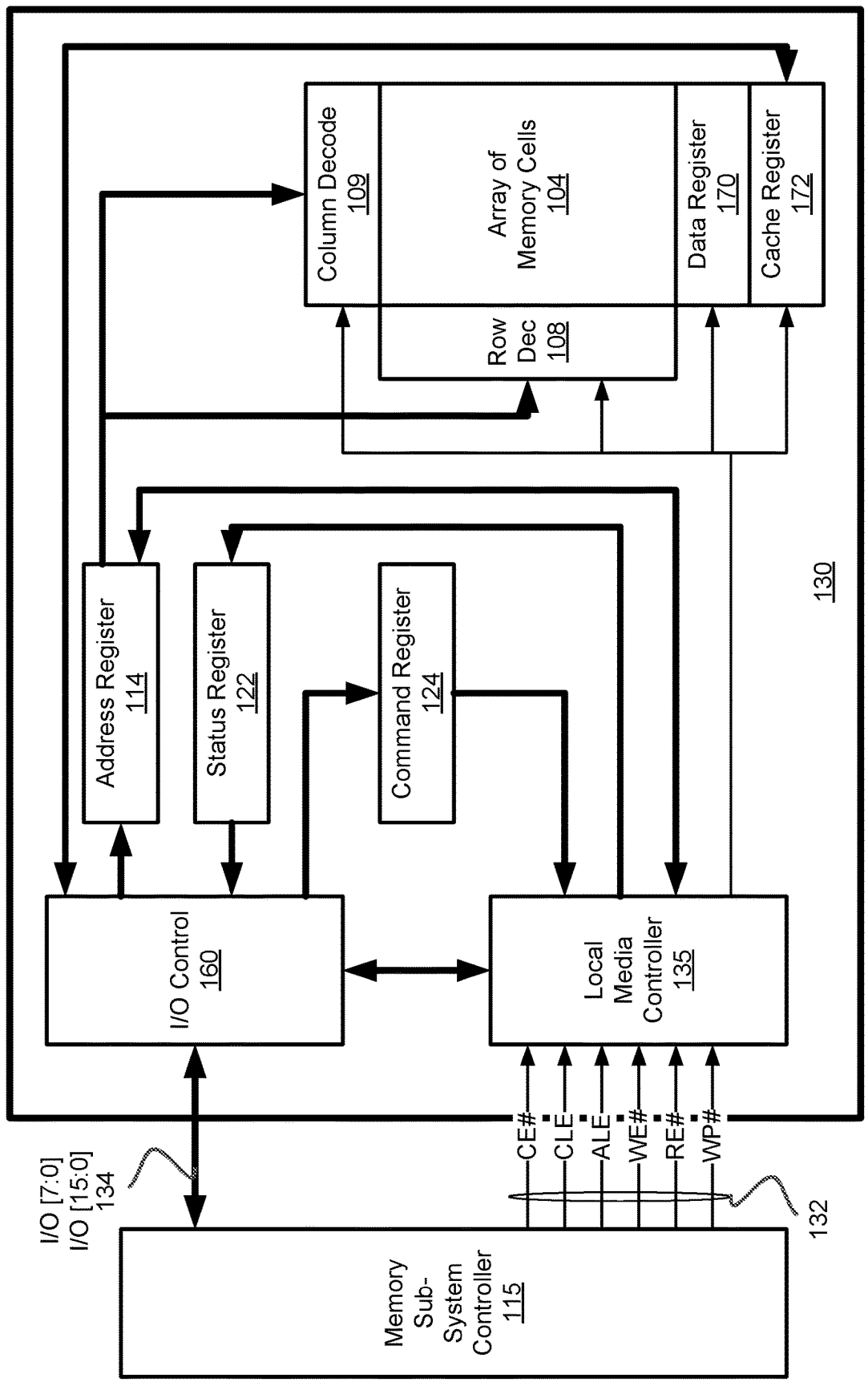
FIG. 1B is a block diagram of a memory device in communication with a memory sub-system controller of a memory sub-system, in accordance with some embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bit line). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 109 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 109 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 109 to control the row decode circuitry 108 and column decode circuitry 109 in response to the addresses. In one embodiment, the local media controller 135 implements the improved program scheme for edge data wordlines the array of memory cells 104.

The local media controller 135 is also in communication with a cache register 172. Cache register 172 latches data, either incoming or outgoing, as directed by the local media controller 135 to temporarily store data while the array of memory cells 104 is busy writing or reading, respectively, other data. During a program operation (e.g., write operation), data may be passed from the cache register 172 to the data register 170 for transfer to the array of memory cells 104; then new data may be latched in the cache register 172 from the I/O control circuitry 160. During a read operation, data may be passed from the cache register 172 to the I/O control circuitry 160 for output to the memory sub-system controller 115; then new data may be passed from the data register 170 to the cache register 172. The cache register 172 and/or the data register 170 may form (e.g., may form a portion of) a page buffer of the memory device 130. A page buffer may further include sensing devices (not shown in FIG. 1B) to sense a data state of a memory cell of the array of memory cells 104, e.g., by sensing a state of a data line connected to that memory cell. A status register 122 may be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 134 and outputs data to the memory sub-system controller 115 over I/O bus 134.

For example, the commands may be received over input/output (I/O) pins [7:0] of I/O bus 134 at I/O control circuitry 160 and may then be written into command register 124. The addresses may be received over input/output (I/O) pins [7:0] of I/O bus 134 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 172. The data may be subsequently written into data register 170 for programming the array of memory cells 104.

In an embodiment, cache register 172 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 1B has been simplified. It should be recognized that the functionality of the various block components described with reference to FIG. 1B may not necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) may be used in the various embodiments.

Figure 2:
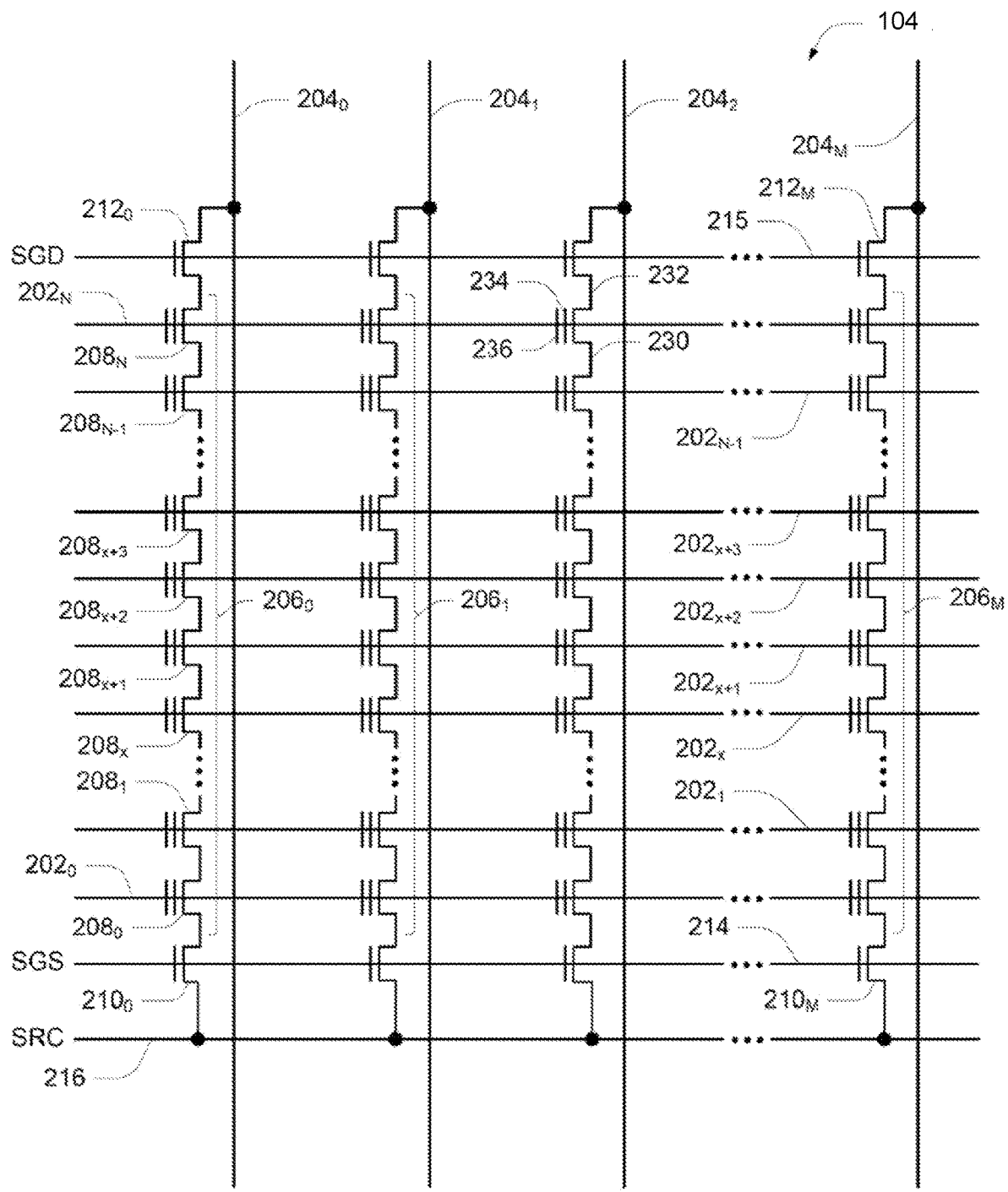
FIG. 2 is a schematic of portions of an array of memory cells as could be used in a memory of the type described with reference to FIG. 1B in accordance with some embodiments of the present disclosure.

FIG. 2 is a schematic of portions of an array of memory cells 104, such as a NAND memory array, as could be used in a memory of the type described with reference to FIG. 1B according to an embodiment. Memory array 104 includes access lines, such as wordlines $202_0$ to $202_N$, and data lines, such as bit lines $204_0$ to $204_M$. The wordlines 202 can be connected to global access lines (e.g., global wordlines), not shown in FIG. 2, in a many-to-one relationship. For some embodiments, memory array 104 can be formed over a semiconductor that, for example, can be conductively doped to have a conductivity type, such as a p-type conductivity, e.g., to form a p-well, or an n-type conductivity, e.g., to form an n-well.

Memory array 104 can be arranged in rows (each corresponding to a wordline 202) and columns (each corresponding to a bit line 204). Each column can include a string of series-connected memory cells (e.g., non-volatile memory cells), such as one of NAND strings $206_0$ to $206_M$. Each NAND string 206 can be connected (e.g., selectively connected) to a common source (SRC) 216 and can include memory cells $208_0$ to $208_N$. The memory cells 208 can represent non-volatile memory cells for storage of data. The memory cells 208 of each NAND string 206 can be connected in series between a select gate 210 (e.g., a field-effect transistor), such as one of the select gates $210_0$ to $210_M$ (e.g., that can be source select transistors, commonly referred to as select gate source), and a select gate 212 (e.g., a field-effect transistor), such as one of the select gates $212_0$ to $212_M$ (e.g., that can be drain select transistors, commonly referred to as select gate drain). Select gates $210_0$ to $210_M$ can be commonly connected to a select line 214, such as a source select line (SGS), and select gates $212_0$ to $212_M$ can be commonly connected to a select line 215, such as a drain select line (SGD). Although depicted as traditional field-effect transistors, the select gates 210 and 212 can utilize a structure similar to (e.g., the same as) the memory cells 208. The select gates 210 and 212 can represent a number of select gates connected in series, with each select gate in series configured to receive a same or independent control signal.

A source of each select gate 210 can be connected to common source 216. The drain of each select gate 210 can be connected to a memory cell $208_0$ of the corresponding NAND string 206. For example, the drain of select gate $210_0$ can be connected to memory cell $208_0$ of the corresponding NAND string $206_0$. Therefore, each select gate 210 can be configured to selectively connect a corresponding NAND string 206 to the common source 216. A control gate of each select gate 210 can be connected to the select line 214.

The drain of each select gate 212 can be connected to the bit line 204 for the corresponding NAND string 206. For example, the drain of select gate $212_0$ can be connected to the bit line $204_0$ for the corresponding NAND string $206_0$. The source of each select gate 212 can be connected to a memory cell $208_N$ of the corresponding NAND string 206. For example, the source of select gate $212_0$ can be connected to memory cell $208_N$ of the corresponding NAND string $206_0$. Therefore, each select gate 212 can be configured to selectively connect a corresponding NAND string 206 to the corresponding bit line 204. A control gate of each select gate 212 can be connected to select line 215.

The memory array 104 in FIG. 2 can be a quasi-two-dimensional memory array and can have a generally planar structure, e.g., where the common source 216, NAND strings 206 and bit lines 204 extend in substantially parallel planes. Alternatively, the memory array 104 in FIG. 2 can be a three-dimensional memory array, e.g., where NAND strings 206 can extend substantially perpendicular to a plane containing the common source 216 and to a plane containing the bit lines 204 that can be substantially parallel to the plane containing the common source 216.

Typical construction of memory cells 208 includes a data-storage structure 234 (e.g., a floating gate, charge trap, and the like) that can determine a data state of the memory cell (e.g., through changes in threshold voltage), and a control gate 236, as shown in FIG. 2. The data-storage structure 234 can include both conductive and dielectric structures while the control gate 236 is generally formed of one or more conductive materials. In some cases, memory cells 208 can further have a defined source/drain (e.g., source) 230 and a defined source/drain (e.g., drain) 232. The memory cells 208 have their control gates 236 connected to (and in some cases form) a wordline 202.

A column of the memory cells 208 can be a NAND string 206 or a number of NAND strings 206 selectively connected to a given bit line 204. A row of the memory cells 208 can be memory cells 208 commonly connected to a given wordline 202. A row of memory cells 208 can, but need not, include all the memory cells 208 commonly connected to a given wordline 202. Rows of the memory cells 208 can often be divided into one or more groups of physical pages of memory cells 208, and physical pages of the memory cells 208 often include every other memory cell 208 commonly connected to a given wordline 202. For example, the memory cells 208 commonly connected to wordline $202_N$ and selectively connected to even bit lines 204 (e.g., bit lines $204_0$, $204_2$, $204_4$, etc.) can be one physical page of the memory cells 208 (e.g., even memory cells) while memory cells 208 commonly connected to wordline $202_N$ and selectively connected to odd bit lines 204 (e.g., bit lines $204_1$, $204_3$, $204_5$, etc.) can be another physical page of the memory cells 208 (e.g., odd memory cells).

Although bit lines $204_3$-$204_5$ are not explicitly depicted in FIG. 2, it is apparent from the figure that the bit lines 204 of the array of memory cells 104 can be numbered consecutively from bit line $204_0$ to bit line $204_M$. Other groupings of the memory cells 208 commonly connected to a given wordline 202 can also define a physical page of memory cells 208. For certain memory devices, all memory cells commonly connected to a given wordline can be deemed a physical page of memory cells. The portion of a physical page of memory cells (which, in some embodiments, could still be the entire row) that is read during a single read operation or programmed during a single programming operation (e.g., an upper or lower page of memory cells) can be deemed a logical page of memory cells. A block of memory cells can include those memory cells that are configured to be erased together, such as all memory cells connected to wordlines $202_0$-$202_N$ (e.g., all NAND strings 206 sharing common wordlines 202). Unless expressly distinguished, a reference to a page of memory cells herein refers to the memory cells of a logical page of memory cells. Although the example of FIG. 2 is discussed in conjunction with NAND flash, the embodiments and concepts described herein are not limited to a particular array architecture or structure, and can include other structures (e.g., SONOS, phase change, ferroelectric, etc.) and other architectures (e.g., AND arrays, NOR arrays, etc.).

FIG. 3 is a block diagram illustrating a wordline configuration of a block 300 in a memory device in accordance with some embodiments of the present disclosure. In one embodiment, block 300 represents a portion of memory array 104, as shown in FIG. 1A, FIG. 1B, and FIG. 2. As illustrated in FIG. 3, block 300 can include a number of wordlines WL0-WL185, arranged in a vertical stack. These wordlines can represent some portion of wordlines $202_0$ to $202_N$, for example. In one embodiment, block 300 further includes a select line coupled to a source select gate device (SGS) at the bottom of the vertical stack and a select line coupled to a drain select gate device (SGD) at the top of the vertical stack. Each of the wordlines WL0-WL185 can be coupled to one or more memory cells which form vertical memory strings in block 300 surrounding pillars of channel material, and can receive control signals to perform memory access operations on the associated memory cells. Depending on the embodiment, block 300 can include some other number of wordlines and/or select lines.

In one embodiment, wordlines WL0-WL2, WL92-WL93, and WL183-WL185 are referred to as dummy wordlines and are generally not used for storing data. Wordlines WL3-WL91 and WL94-WL182 can be referred to as data wordlines which are used for storing data (e.g., host data or system data). In one embodiment, the data wordlines are arranged into two contiguous decks, separated by dummy wordlines WL92-WL93. The data wordlines in each deck can generally be coupled to memory cells configured as a higher-level memory, such as QLC memory for example. In order to improve performance and reliability, however, the edge wordlines in each deck, such as data wordlines WL3, WL91, WL94, and WL 182 (i.e., the data wordlines in each deck immediately adjacent to the surrounding dummy wordlines) can be configured as a lower-level memory, such as MLC memory for example.

In one embodiment, control logic, such as local media controller 135 of memory device 130, can perform a memory access operation, such as a programming operation, on block 300 sequentially starting from a first data wordline WL3 at the bottom of the vertical stack to a last data wordline WL182 at the top of the vertical stack. Thus, the last data wordline WL182 will be disposed on the top of the top deck of data wordlines, immediately below the dummy wordlines WL183-185 at the top of the vertical stack, and will be the last data wordline to be programmed in a sequential programming operation. If, for example, block 300 had some other arrangement of wordlines, and/or if the programming operation were to progress from the top down, the last data wordline could be some other wordline in the block 300.

As will be discussed in more detail below, when a programming operation is being performed, the control logic can cause a program voltage to be applied to a selected data wordline (e.g., WL3) for a certain amount of time, referred to herein as a pulse duration period. The control logic can concurrently cause a first pass voltage to be applied to one or more unselected data wordlines (e.g., WL4-WL90 and WL94-WL181) for the pulse duration period, and cause a second pass voltage to be applied to the last unselected data wordline (i.e., WL182) for at least a first portion of the pulse duration period. In one embodiment, the second pass voltage has a lower magnitude than the first pass voltage.

Figure 4:
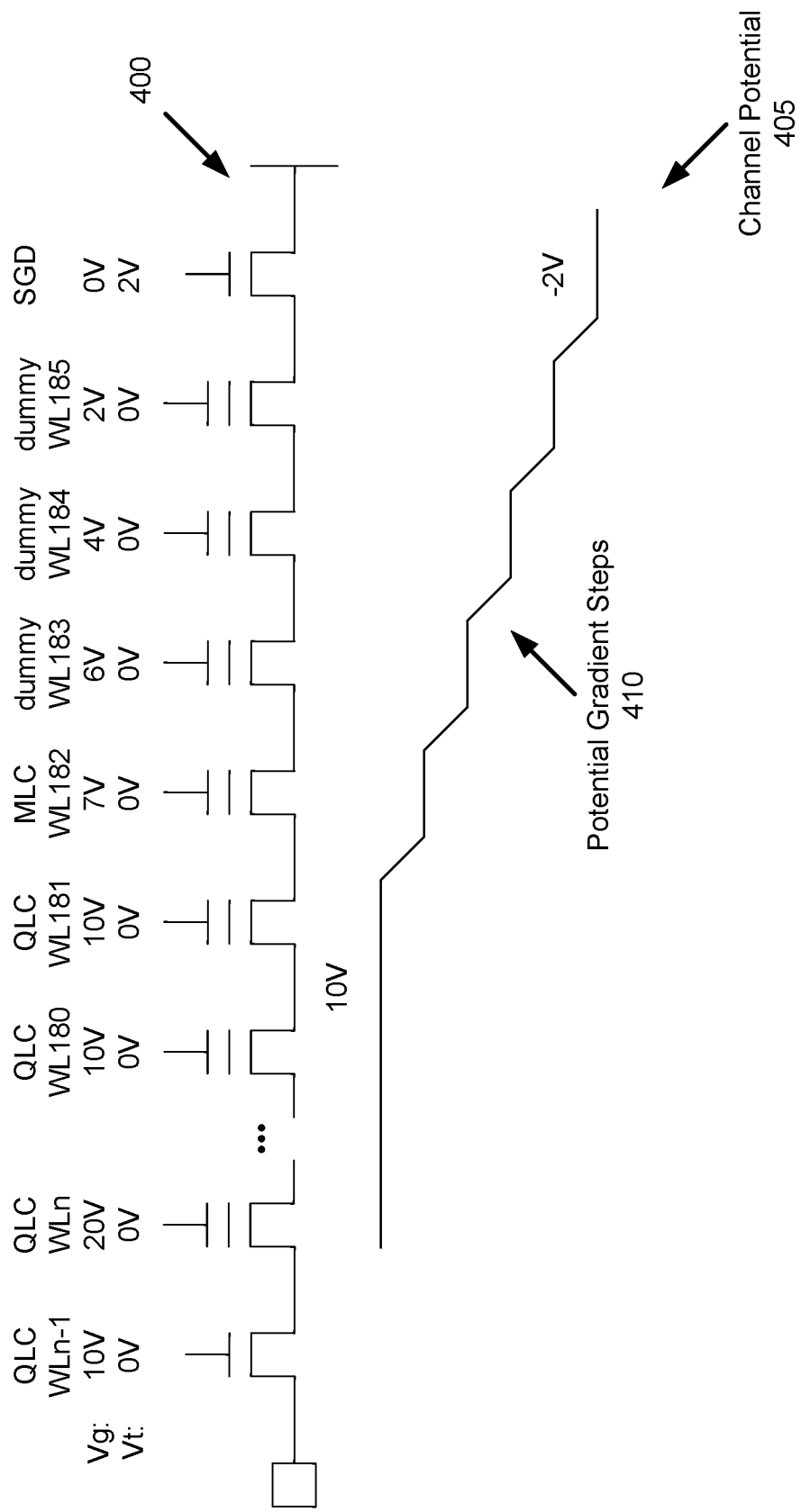
FIG. 4 is a diagram illustrating the channel potential for a string of memory cells in a memory device implementing an improved program scheme for edge data wordlines, in accordance with some embodiments of the present disclosure.

FIG. 4 is a diagram illustrating the channel potential for a string of memory cells 400 in a memory device implementing an improved program scheme for edge data wordlines, in accordance with some embodiments of the present disclosure. In one embodiment, the string 400 can be part of a block of a memory device, such as block 300 of memory device 130. In one embodiment, the string 400 includes a drain select gate (SGD) device and a number of memory cells, each connected to a separate word line (WL). In one embodiment, one or more of the memory cells are connected to a dummy wordline (DWL) and are generally not used for storing data. A least one of the memory cells in string 200 can be connected to a selected wordline (i.e., the wordline being programmed (WLn)) and each remaining memory cell can be connected to wordlines referred to as data wordlines (WLn-1, WL180-WL182) or dummy wordlines (WL183-WL185). Depending on the embodiment, there can be any number of data wordlines and/or dummy wordlines. In one embodiment, string 400 represents one sub-block of a block 300 of memory cells of memory device 130. As described above, the block can include additional sub-blocks having additional strings of memory cells which are coupled to the same wordlines as the corresponding memory cells and/or other devices of string 400.

In one embodiment, each of the devices in string 400 has an associated threshold voltage (Vt) which represents a voltage at which each device switches from an "off" state to an "on" state, or vice versa. For example, SGD can have a threshold voltage of 2V, and the memory cells connected the wordlines WLn-1 . . . WL185 can have a threshold voltage of 0V. In other embodiments, other threshold voltages are possible. In one embodiment, the channel potential 405 of the string 400 represents a difference between a voltage applied at the control gate of each device (i.e., a gate voltage (Vg)) and the associated threshold voltage.

As described above, in one embodiment, control logic, such as local media controller 135 can cause different voltage signals to be applied to the gate terminals of different devices during a memory access operation, such as a programming operations. These voltage signals can be referred to as the respective gate voltages (Vg). As illustrated in FIG. 4, in one embodiment, the control logic can cause a program voltage (e.g., 20V) to be applied to a selected data wordline (e.g., WLn) for a certain pulse duration period. Concurrently, the control logic can cause a first pass voltage (e.g., 10V) to be applied to one or more unselected data wordlines (e.g., WLn-1 and WL 180-WL181) for the pulse duration period, and cause a second pass voltage (e.g., 7V) to be applied to the last unselected data wordline (i.e., WL182) for at least a first portion of the pulse duration period. In addition, the control logic can cause other lower voltages (e.g., 6V, 4V, 2V) to be applied to the dummy wordlines (e.g., WL183-WL185) and a ground voltage (i.e. 0V) to be applied to the select line of the drain select gate device SGD.

As a result, the channel potential 405 at the drain select gate device is -2V (i.e., a gate voltage of 0V minus the threshold voltage of 2V) and the channel potential 405 at unselected wordlines WL180-WL181 is 10V (i.e., a gate voltage of 10V minus the threshold voltage of 0V). The intervening wordlines, including the last data wordline WL182 and dummy wordlines WL183-WL185 can be used to transition the channel potential 405 through the 12V differential (i.e., 10V minus -2V). For example, by causing certain voltage to be applied to the last data wordline WL182 and dummy wordlines WL183-WL185, the control logic can soften the transition by forming a number of potential gradient steps 410 between the unselected wordlines WL180-WL181 and the select gate device (SGD). Applying the second pass voltage having a lower magnitude (e.g., 7V) on the last data wordline WL182 reduces the channel potential at that point to 7V (i.e., a gate voltage of 7V minus the threshold voltage of 0V). Accordingly, the differential between that point is reduced from 12V to 9V (i.e., 7V minus -2V). Thus, the size of the potential gradient steps 410 associated with dummy wordlines WL183-WL185 can be reduced as the channel potential 405 transitions to -2V at the select gate device (SGD). If the first pass voltage having the higher magnitude (e.g., 10C) were applied on the last data wordline WL182, the differential between that point and the select gate device (SGD) would remain at 12V and the potential gradient steps 410 would be larger and steeper leading to additional hot-e injection and program disturb at the last data wordline WL182.

Figure 5:
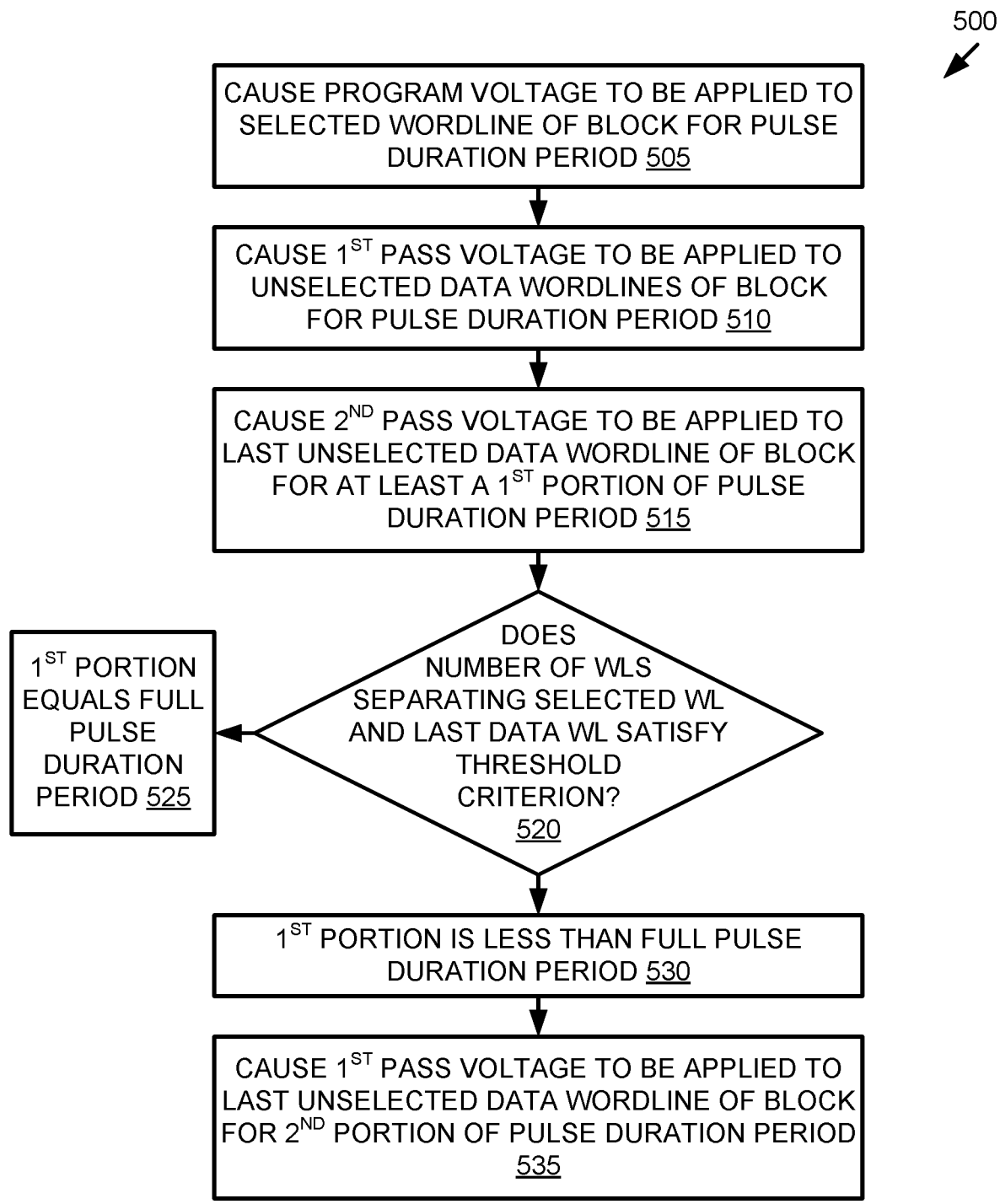
FIG. 5 is a flow diagram of an example method of a program scheme for edge data wordlines in a memory device in accordance with some embodiments of the present disclosure.

FIG. 5 is a flow diagram of an example method of a program scheme for edge data wordlines in a memory device in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by local media controller 135 of FIG. 1A and FIG. 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, a program voltage is applied. For example, control logic (e.g., local media controller 135) can cause a program voltage (e.g., 20V) to be applied to a selected data wordline (e.g., WLn) of a plurality of wordlines of a block of the memory array, such as block 300 of memory array 104, for a pulse duration period during a programming operation. The program voltage can cause charge to be stored at one or more memory cells associated with the selected data wordline. The pulse duration period can be a set period of time defined by the local media controller 135 of memory device 130 to enable sufficient charge to be stored at the one or more memory cells representing a desired value to be programmed.

At operation 510, a first pass voltage is applied. For example, the control logic can cause a first pass voltage (e.g., 10V) to be applied to one or more unselected data wordlines of the plurality of wordlines of the block for the pulse duration period. The one or more unselected data wordlines can include other wordlines in the block 300 that are not currently being programmed, except for a last data wordline in the block 300. In one embodiment, the block, such as block 300 includes one or more strings of memory cells surrounding a pillar of channel material. The pass voltage boosts a memory pillar channel voltage (e.g., due to gate to channel capacitive coupling) a higher boost voltage to inhibit the memory cells associated with the unselected data wordlines from being programmed.

At operation 515, a second pass voltage is applied. For example, the control logic can cause a second pass voltage (e.g., 7V) to be applied to the last unselected data wordline of the plurality of wordlines of the block for at least a first portion of the pulse duration period. Although, the second pass voltage has a lower magnitude than the first pass voltage, the second pass voltage can still boots the memory pillar channel voltage high enough to inhibit the associated memory cells from being programmed. The magnitude of the second pass voltage is low enough, however, to decrease the channel voltage differential between the last unselected data wordline and a source select gate device (SGD) and reduce the occurrence of hot-e injection and program disturb at the last unselected data wordline. In one embodiment, the last data wordline WL182 will be disposed on the top of a top deck of data wordlines, immediately below one or more dummy wordlines WL183-185 at the top of a vertical stack, and will be the last data wordline to be programmed in a sequential programming operation.

Figure 6A:
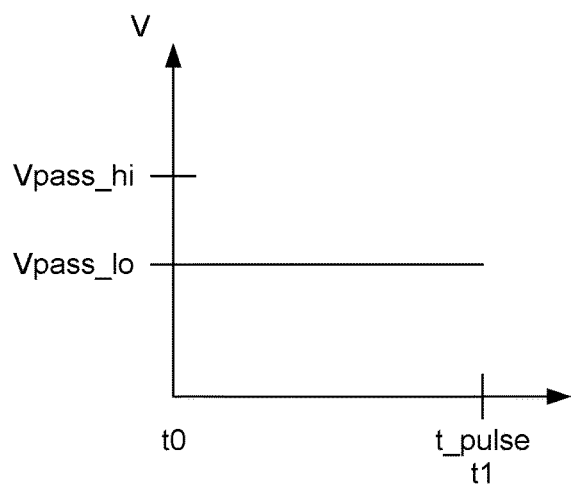
FIGS. 6A-6D are charts illustrating voltage steps and timing for an improved program scheme for edge data wordlines in a memory device, in accordance with some embodiments of the present disclosure.
Figure 6B:
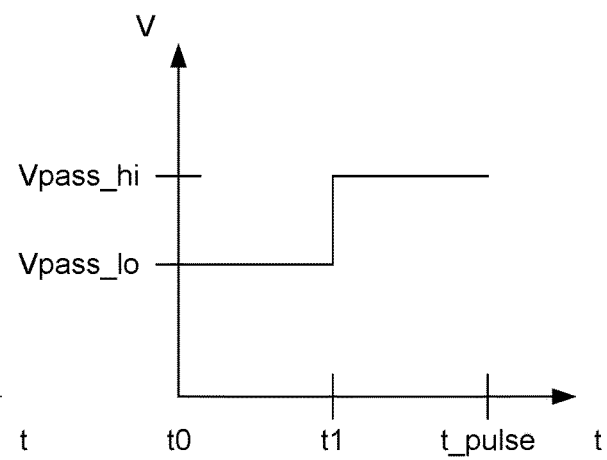
Figure 6C:
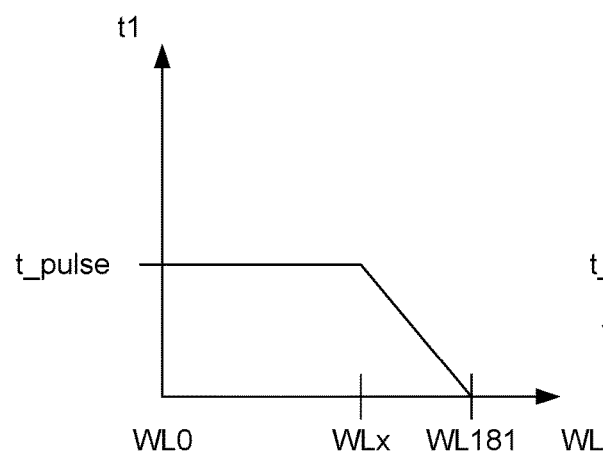

At operation 520, a determination is made. For example, the control logic can determine whether a number of wordlines separating the selected data wordline and the last unselected data wordline satisfies a threshold criterion. In one embodiment, the threshold criterion is satisfied when the number of wordlines separating the selected data wordline and the last unselected data wordline is greater than a threshold number. FIG. 6C is a chart illustrating one example. For example, if the last data wordline is WL182, if the selected wordline being programed is any wordline less than WLx, the threshold criterion is satisfied. Thus, in this example, the threshold number is WL182-WLx. Therefore, if the selected wordline being programmed is any wordline greater than WLx, the threshold criterion is not satisfied.

At operation 525, responsive to the number of wordlines separating the selected data wordline and the last unselected data wordline satisfying the threshold criterion, the control logic can cause the first portion of the pulse duration period during which the second pass voltage is applied to the last unselected data wordline to be equal to the pulse duration period. As illustrated in FIG. 6A, the second pass voltage (Vpass_lo) can be applied to the last unselected data wordline from a time t0 to a time t1, which in this case is equal to the pulse duration period (t_pulse).

At operation 530, responsive to the number of wordlines separating the selected data wordline and the last unselected data wordline not satisfying the threshold criterion, the control logic can cause the first portion of the pulse duration period during which the second pass voltage is applied to the last unselected data wordline to be less than the pulse duration period. As illustrated in FIG. 6B, the second pass voltage (Vpass_lo) can be applied to the last unselected data wordline for the first portion (i.e., from a time t0 to a time t1, which in this case is less than the pulse duration period (t_pulse)).

Figure 6D:
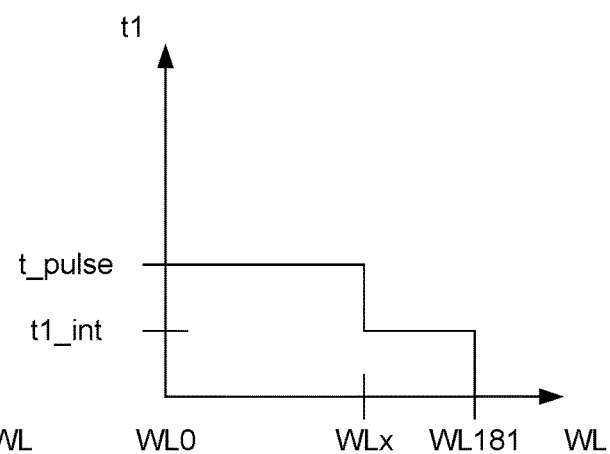

At operation 535, the first pass voltage is applied. For example, the control logic can cause the first pass voltage (e.g., 10V) to be applied to the last unselected data wordline of the plurality of wordlines of the block for a second portion of the pulse duration period, wherein the second portion of the pulse duration period is subsequent to the first portion of the pulse duration period. As illustrated in FIG. 6B, the first pass voltage (Vpass_hi) can be applied to the last unselected data wordline for the second portion (i.e., from a time t1 until the end of the pulse duration period t_pulse)). Since the channel potential boosting effects from the second pass voltage can degrade over the course of the pulse duration period, it can be beneficial to apply the higher first pass voltage for the second portion, thereby forming a two-stage inhibit signal with a step-up in magnitude. In one embodiment, a length of the first portion of the pulse duration period during which the second pass voltage is applied to the last unselected data wordline is variable based on the number of wordlines in the vertical stack separating the selected data wordline and the last unselected data wordline. For example, as shown in FIG. 6C, once the selected wordline being programed reaches WLx, the time t1 starts decreasing linearly from being equal to the pulse duration period (t_pulse) until the selected wordline reaches WL181 (i.e., the wordline immediately preceding the last data wordline). In another embodiment, as shown in FIG. 6D, the time t1 defining the first portion of the pulse duration period can be equal to the pulse duration period (t_pulse) as long as the selected wordline is less than or equal to WLx. Once the selected wordline reaches WLx, however, the time t1 decreases to some intermediate value (e.g., t1_int) less than the pulse duration period up until WL181. Other variations are possible depending on the embodiment.

Figure 7:
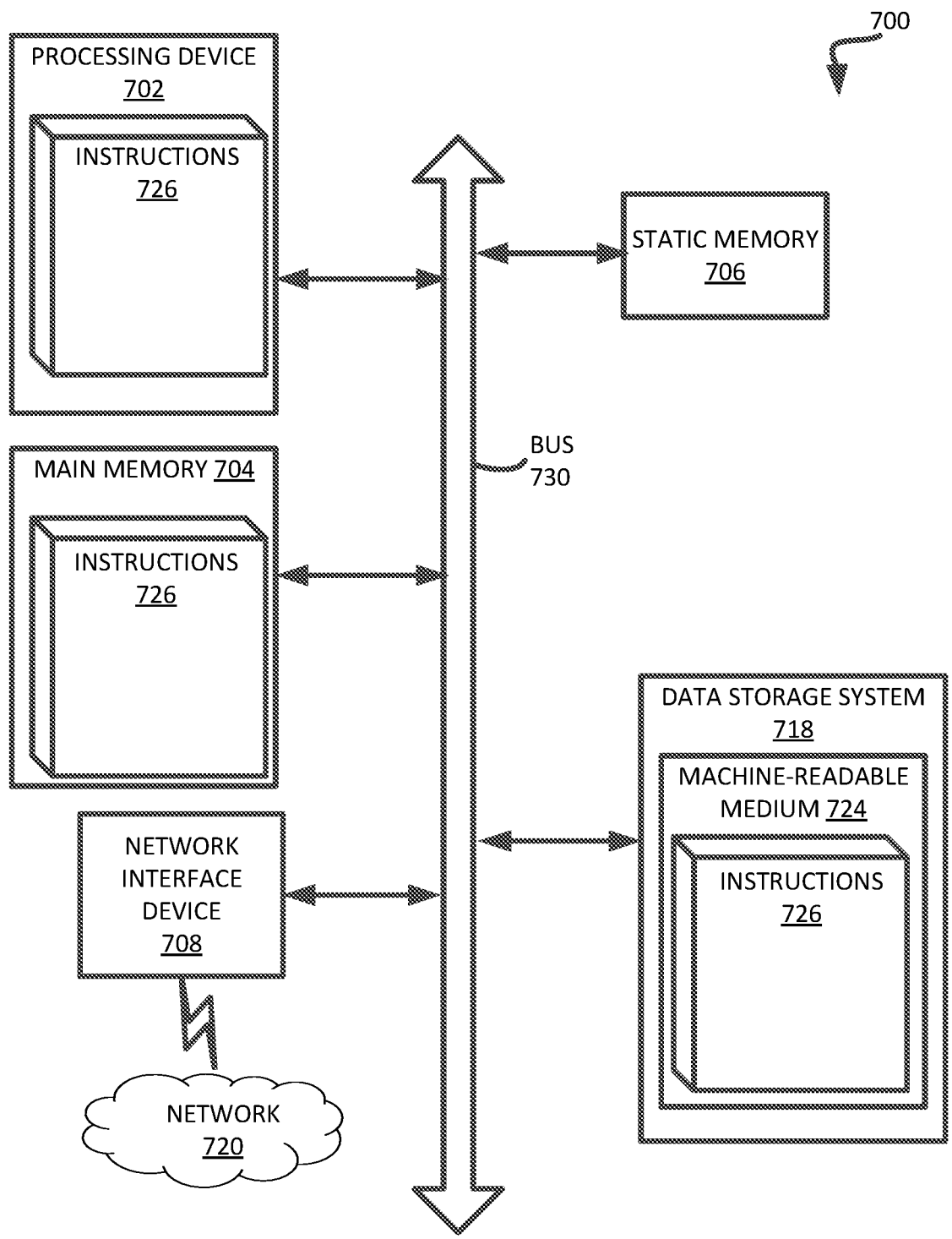
FIG. 7 is a block diagram of an example computer system in which embodiments of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the local media controller 135 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to the local media controller 135 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:
a memory array; and
control logic, operatively coupled with the memory array, to perform operations comprising:
  causing a program voltage to be applied to a selected data wordline of a plurality of wordlines of a block of the memory array for a pulse duration period during a programming operation;
  causing a first pass voltage to be applied to one or more unselected data wordlines of the plurality of wordlines of the block for the pulse duration period, wherein the one or more unselected data wordlines does not include a last unselected wordline of the plurality of wordlines; and
  causing a second pass voltage to be applied to the last unselected data wordline of the plurality of wordlines of the block for at least a first portion of the pulse duration period, wherein the last unselected wordline is a last wordline of the plurality of wordlines to be programmed in a sequential programming operation, and wherein the second pass voltage has a lower magnitude than the first pass voltage.

2. The memory device of claim 1, wherein the block of the memory array comprises the plurality of wordlines arranged in a vertical stack, and wherein the programming operation is performed sequentially from a first data wordline at a bottom of the vertical stack to the last data wordline at a top of the vertical stack.

3. The memory device of claim 2, wherein the plurality of wordlines comprises one or more dummy wordlines arranged above the last data wordline at the top of the stack.

4. The memory device of claim 2, wherein when a number of wordlines in the vertical stack separating the selected data wordline and the last unselected data wordline satisfies a threshold criterion, the first portion of the pulse duration period during which the second pass voltage is applied to the last unselected data wordline is equal to the pulse duration period.

5. The memory device of claim 2, wherein when a number of wordlines in the vertical stack separating the selected data wordline and the last unselected data wordline does not satisfy a threshold criterion, the first portion of the pulse duration period during which the second pass voltage is applied to the last unselected data wordline is less than the pulse duration period.

6. The memory device of claim 5, wherein the control logic is to perform operations further comprising:
causing the first pass voltage to be applied to the last unselected data wordline for a second portion of the pulse duration period, wherein the second portion of the pulse duration period is subsequent to the first portion of the pulse duration period.

7. The memory device of claim 5, wherein a length of the first portion of the pulse duration period during which the second pass voltage is applied to the last unselected data wordline is variable based on the number of wordlines in the vertical stack separating the selected data wordline and the last unselected data wordline.

8. A method comprising:
causing a program voltage to be applied to a selected data wordline of a plurality of wordlines of a block of a memory array in a memory device for a pulse duration period during a programming operation;
causing a first pass voltage to be applied to one or more unselected data wordlines of the plurality of wordlines of the block for the pulse duration period, wherein the one or more unselected data wordlines does not include a last unselected wordline of the plurality of wordlines; and
causing a second pass voltage to be applied to the last unselected data wordline of the plurality of wordlines of the block for at least a first portion of the pulse duration period, wherein the last unselected wordline is a last wordline of the plurality of wordlines to be programmed in a sequential programming operation, and wherein the second pass voltage has a lower magnitude than the first pass voltage.

9. The method of claim 8, wherein the block of the memory array comprises the plurality of wordlines arranged in a vertical stack, and wherein the programming operation is performed sequentially from a first data wordline at a bottom of the vertical stack to the last data wordline at a top of the vertical stack.

10. The method of claim 9, wherein the plurality of wordlines comprises one or more dummy wordlines arranged above the last data wordline at the top of the stack.

11. The method of claim 9, wherein when a number of wordlines in the vertical stack separating the selected data wordline and the last unselected data wordline satisfies a threshold criterion, the first portion of the pulse duration period during which the second pass voltage is applied to the last unselected data wordline is equal to the pulse duration period.

12. The method of claim 9, wherein when a number of wordlines in the vertical stack separating the selected data wordline and the last unselected data wordline does not satisfy a threshold criterion, the first portion of the pulse duration period during which the second pass voltage is applied to the last unselected data wordline is less than the pulse duration period.

13. The method of claim 12, further comprising:
causing the first pass voltage to be applied to the last unselected data wordline for a second portion of the pulse duration period, wherein the second portion of the pulse duration period is subsequent to the first portion of the pulse duration period.

14. The method of claim 12, wherein a length of the first portion of the pulse duration period during which the second pass voltage is applied to the last unselected data wordline is variable based on the number of wordlines in the vertical stack separating the selected data wordline and the last unselected data wordline.

15. A memory device comprising:
a plurality of data wordlines arranged in a vertical stack, wherein the plurality of data wordlines are coupled to a first plurality of memory cells used to store data; and
a plurality of dummy wordlines positioned above the plurality of data wordlines in the vertical stack, wherein the plurality of dummy wordlines are coupled to a second plurality of memory cells not used to store data,
wherein, during a programming operation, a program voltage is applied to a selected data wordline of the plurality of data wordlines for a pulse duration period,
wherein, a first pass voltage is applied to one or more unselected data wordlines of the plurality of data wordlines for the pulse duration period, wherein the one or more unselected data wordlines does not include a last unselected wordline of the plurality of wordlines, and
wherein, a second pass voltage is applied to the last unselected data wordline of the plurality of wordlines of the block for at least a first portion of the pulse duration period, wherein the last unselected wordline is a last wordline of the plurality of wordlines to be programmed in a sequential programming operation, and wherein the second pass voltage has a lower magnitude than the first pass voltage.

16. The memory device of claim 15, wherein the last data wordline is disposed immediately below the plurality of dummy wordlines.

17. The memory device of claim 15, wherein when a number of wordlines in the vertical stack separating the selected data wordline and the last unselected data wordline satisfies a threshold criterion, the first portion of the pulse duration period during which the second pass voltage is applied to the last unselected data wordline is equal to the pulse duration period.

18. The memory device of claim 15, wherein when a number of wordlines in the vertical stack separating the selected data wordline and the last unselected data wordline does not satisfy a threshold criterion, the first portion of the pulse duration period during which the second pass voltage is applied to the last unselected data wordline is less than the pulse duration period.

19. The memory device of claim 18, wherein the control logic is to perform operations further comprising:

causing the first pass voltage to be applied to the last unselected data wordline for a second portion of the pulse duration period, wherein the second portion of the pulse duration period is subsequent to the first portion of the pulse duration period.

20. The memory device of claim 18, wherein a length of the first portion of the pulse duration period during which the second pass voltage is applied to the last unselected data wordline is variable based on the number of wordlines in the vertical stack separating the selected data wordline and the last unselected data wordline.

\* \* \* \* \*